US006812655B1

(12) United States Patent
Wang et al.

(10) Patent No.: US 6,812,655 B1
(45) Date of Patent: Nov. 2, 2004

(54) INDUCTION ACTUATED CONTAINER

(76) Inventors: Xin Wang, No. 42 Tongtai Bridge, Taijiang District Fuzhou City, Fujian Province 350000 (CN); Wen Chen, Room 801, 1 Building Hualin Harden, Lianjiang Middle Road, Fuzhou City, Fujian Province 350011 (CN)

( * ) Notice: Subject to any disclaimer, the term of this patent is extended or adjusted under 35 U.S.C. 154(b) by 0 days.

(21) Appl. No.: 10/204,813

(22) PCT Filed: May 23, 2000

(86) PCT No.: PCT/CN00/00127

§ 371 (c)(1), (2), (4) Date: Dec. 10, 2002

(87) PCT Pub. No.: WO01/62617

PCT Pub. Date: Aug. 30, 2001

(30) Foreign Application Priority Data

Feb. 26, 2000 (CN) ....................................... 00204125 U

(51) Int. Cl.$^{7}$ .................................................. H02P 7/14

(52) U.S. Cl. ..................... 318/3; 318/6; 318/9; 318/10; 318/445; 318/449; 318/450

(58) Field of Search .......................... 318/3, 9, 10, 445, 318/449, 480, 450; 220/211

(56) References Cited

U.S. PATENT DOCUMENTS 4,489,810 A * 12/1984 Curtis ..................... 312/272.5
4,729,490 A 3/1988 Ziegenbein ................. 220/211
4,981,275 A 1/1991 Sheu .......................... 248/147
5,100,264 A * 3/1992 Chang et al. ................. 406/19
5,329,212 A * 7/1994 Feigleson .................... 318/16
5,337,581 A 8/1994 Lott ............................ 62/264
5,770,935 A * 6/1998 Smith et al. ................ 318/480
5,932,982 A * 8/1999 Pezzelli, Jr. ................ 318/480
6,150,939 A * 11/2000 Lin ......................... 340/568.1

FOREIGN PATENT DOCUMENTS

CN 2067690 U 12/1990
CN 2328624 Y 5/1999
DE 44 39 640 A1 5/1996

* cited by examiner

*Primary Examiner*—Rina Duda
(74) *Attorney, Agent, or Firm*—Westman, Champlin & Kelly, P.A.

(57) ABSTRACT

An induction actuated container includes a container body, a container cover, a drive and an induction element. The drive includes a driven operating member and a driving member. The induction elements includes a sensor and an actuating controller for the driving member. One end of the driven operating member is transmissively connected with the container cover, the other end is transmissively connected with the driving member, and the sensor is electrically connected with the actuating controller for the driving member, and the actuating controller for the driving member is connected with a controlling end of the driving member. A signal caused by the approaching of a human or object is received by the sensor and is converted into an electrical signal. Then, the actuating controller for the driving member controls the driving member to perform a corresponding mechanical action.

8 Claims, 3 Drawing Sheets

INDUCTION ACTUATED CONTAINER

CLAIM OF PRIORITY

This Application is a Section 371 National Stage Application of International Application No. PCT/CH00/00127 filed 5 May 2000 and published as WO 01/62617, not in English and claims benefit of Chinese Patent Application Serial No. 00204125.1, filed 26 Feb. 2000, which is hereby incorporated by reference in its entirety, and priority is hereby claimed under 35 U.S.C. §119 on both of these applications.

TECHNICAL FIELD OF THE INVENTION

The invention relates to a container with a cover, and more particularly to an induction-actuated container.

DESCRIPTION OF THE RELATED ART

In prior art, containers with covers must be opened and closed manually. This creates inconvenience in operation. When the container is packed with special materials, such as rubbish or medical disposals, manual operation to the container cover will not only be inconvenient, but also have the risk of infection.

SUMMARY OF THE INVENTION

The object of the invention is to provide a convenient and hygiene induction actuated container so as to overcome the disadvantages of the prior art.

The object of the invention is realized through the following aspects.

According to the first aspect of the invention, an induction actuated container having a container body and a container cover, wherein further comprises: a drive means comprising a driven operating member and a driving member. and an induction means comprising a sensor and an actuating controller for the driving member; wherein one end of the driven operating member is transmissively connected with the container cover; another end is transmissively connected with the driving member; the sensor is electrically connected with the actuating controller for the driving member, and the actuating controller for the driving member is connected with the controlling end of the driving member; signal caused by the approaching of human or an object is received by the sensor and is converted into an electrical signal and sends the electrical signal to the actuating controller for the driving member; the actuating controller for the driving member controls the driving member to perform a corresponding mechanical action.

The drive member comes into being a mechanical movement under electric operation. Relevant action from the drive member opens or closes the container cover through driven operating member. Evidently, the approaching of human body or an object to the container will actuate the open action of the container cover. When human body or an object moves away, the triggering to the sensor disappears, then the container cover closes.

The object of the invention could also be realized through the following features.

Movements of the driven operating member and connections to the container cover can be the following modes:

The container cover is hinged with one side of the container body; the driven operating member comprises a crown bar, the top end of the crown bar is hinged with the container cover, and the hinging point between the top end of the crown bar and the container cover is apart from that between the container cover and the container body. The up and down movement of the crown bar opens and closes the container cover respectively.

The driven operating member comprises a crown bar; the top end of the crown bar is connected with the container cover. The container cover in this arrangement only covers on the container without any connection. The up and down movement of the crown bar moves the cover up and down to realize its open and close action respectively.

The driven operating member comprises a rotating bar, the top end of the rotating bar is connected with the container cover at its side edge. The container cover in this arrangement also only covers on the container without any connection. When it is necessary, the rotating bar rotates to a certain angle to separate the container cover from the container to realize the open action of the container cover.

The drive member can be either a motor or an electromagnetic clutch, which provides with up and down movements.

The open and close of the electromagnetic clutch make the crown bar move up and down.

The container body includes the outer body and the inner barrel. The inner barrel is fits in in the outer body.

The drive means and the induction means are generally installed on the outer body. The inner barrel is usually bare. When the container cover is open, the inner barrel could be moved out for the convenience of use.

There are several options to the induction means, especially to the sensor. Some of them are referred as below:

The sensor is an inductive oscillator; the induction means further comprising a filter shaping circuit, the actuating controller for driving member comprising a monostable trigger; the filter shaping circuit is connected between the sensor and the monostable trigger; the monostable trigger is connected to the actuating controller for the driving member; the approaching of an object or human body will change the oscillating frequency of the inductive oscillator, the signal output the inductive oscillator is first filtered and shaped, and then goes through the monostable trigger and the actuating controller for the driving member to make the driving member to perform corresponding mechanical action.

The sensor is a microwave probe, the induction means further comprising an amplifying comparator, and the actuating controller for the driving member further comprising a monostable trigger and a driving circuit; the amplifying comparator is connected between the microwave probe and the monostable trigger; when there is relative radial movement between the transmitted microwave signal and the being measured active object, the signal reflected from the being measured active object will have frequency shift, as a frequency shift signal, the frequency shift signal is amplified and compared by the amplifying comparator; the amplifying comparator then sends out a triggering signal to the monostable trigger and driving circuit to make the driving member to perform corresponding mechanical action.

The sensor comprises an infrared transmitter and an infrared receiver, the induction means further comprising an amplifying comparator, and the actuating controller for the driving member comprising a monostable trigger and a driving circuit; the amplifying comparator is connected between the infrared receiver and the monostable trigger; the infrared receiver receives the signal reflected from human body or object, the amplifying comparator amplifies the received signal and compares with a reference value so that making a judgment, and sends out a triggering signal to the monostable trigger and driving circuit if necessary to make the driving member to perform corresponding mechanical action.

Further, it is preferably comprising a limit means. The limit means has an upper and a lower travel switches and triggering bar; upper and lower travel switches are arranged opposite to each other and mounted to the container body; one end of the triggering bar is connected to the driven operating member; another end is connected between the upper travel switch and the lower travel switch; and the limit means is mounted on the container body.

As a result, as compared with the prior art, the invention has the following advantages: Container cover automatically opens when human body or an object approaches without any direct body contacts. This is not only convenient in use, but also releases people from worries of body contacts with the containers. The invention is especially suitable for the containers for rubbish, medical apparatus, or food.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

First Embodiment

Figure 1:
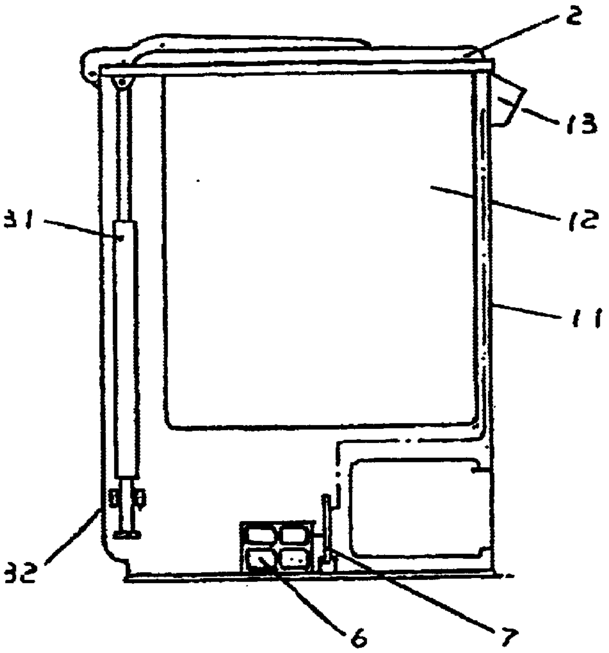
FIG. 1 is a schematic diagram showing configurations of an induction-actuated container according to the first embodiment of the invention.

Referring to FIG. 1, the induction-actuated container consists of a container body 1, container cover 2, drive means, and induction means. The container body includes an outer body 11 and an inner barrel 12. The inner barrel 12 is sat in the outer body 11. The driver means includes a driven operating member 31 and a drive member 32. The driven operating member is a crown bar, which is hinged at the top thereof with the container cover 2. The hinging connection point between the crown bar and the container cover is apart from the hinging point between the container cover 2 and container body and located at the inner side of the hinging point. The drive member 32 is an electromagnetic clutch comprising an electromagnet. The lower part of the crown bar is plugged through the core cavity of the electromagnetic and connected with a magnet. Sensor 4 of the induction means is mounted in the induction window 13. The induction window 13 is located at the upper part of the side wall of the container outer body 11. Other components of the induction means (including battery set 6 and circuit 7) are mounted in the lower part of the container outer body 11.

Figure 2:
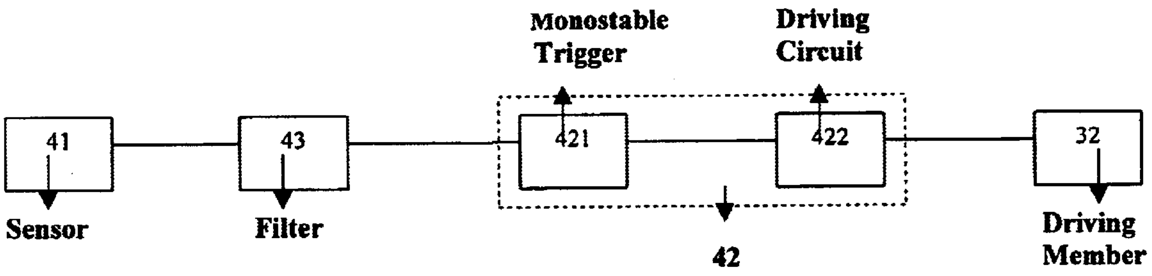
FIG. 2 is a block diagram showing the operating principle of the induction means used in the induction-actuated container according to the first embodiment of the invention.

Referring to FIG. 2, the induction means consists of a sensor 41, a filter shaping circuit 43, and an actuating controller 42 for the driving member. The actuating controller 42 for the driving member includes a monostable trigger 421 and a driving circuit 422. The filter shaping circuit 43 is connected between the sensor and the monostable trigger 421, and the monostable trigger 421 is electrically connected to the drive member 32 via the driving circuit 422.

Figure 3:
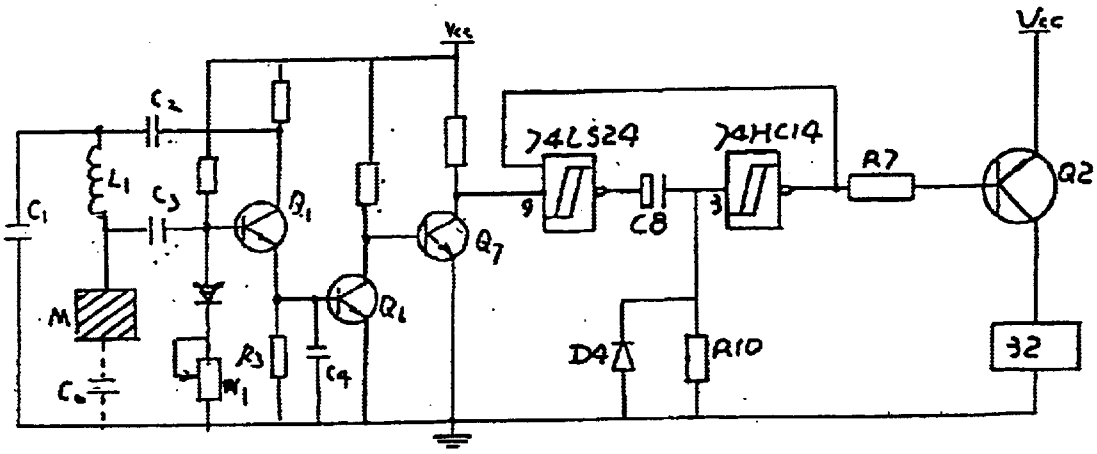
FIG. 3 is a circuit diagram of the induction means used in the induction-actuated actuated container according to the first embodiment of the invention.

Referring to FIG. 3, the sensor 41 is an inductive oscillator, which consists of a triple point capacitor type oscillator by a transistor Q1, capacitors C1 to C3 and an inductance L1, and an induction board M. One end of the induction board M is connected to the inductance L1. There is a distributive capacitor C0 between the induction board M and grounding. The parameters of the distributive capacitor C0 are changed with the approaching of human body. The emitter of the transistor Q1 is connected with resistor R3, capacitor C4 and the base of transistor Q6. The collector of the transistor Q6 is connected with the base of transistor Q7. The collector of the transistor Q7 is connected with pin 9 of the NAND gate 74LS24. Capacitor C8 is connected between pin 9 of NAND gate 74LS24 and pin 3 of phase inverter 74HC14. Pin 3 of the phase inverter 74HC14 is also connected with diode D4 and resistor R10. The monostable trigger 421 is consisted by NAND gate 74LS24, inverter 74HC14, capacitor C8, diode D4, and resistor R10. Pin 4 of the inverter 74HC14 is connected with the base of transistor Q2 via resistor R7. The emitter of transistor Q2 is connected with power supply V. The collector of transistor Q2 is connected with the connector of electromagnetic clutch.

The operation principle of this embodiment is explained as follows.

When human body approaches to the induction board M, the voltage of the high frequency signal at both ends of the distributive capacitor C0 is decreased. Positive feedback voltage to the base of transistor of transistor Q1 via capacitor C3 is not enough to maintain continuous oscillation of the transistor Q1. So oscillation of transistor of transistor Q1 is stopped, so that the current pass through resistor R3 is decreased. Transistor Q6 is turned off, while transistor Q7 is turned on. Collector of transistor Q7 outputs a low level to trigger the monostable trigger 421 to output a low level for a certain interval (about 4 to 6 seconds). Meanwhile transistor Q2 is turned on to make the electromagnet in the electromagnetic clutch to move the crown bar upward to open the container cover. After about 4 to 6 seconds, the electrical supply to the electromagnet is stopped. Then the container cover is felled and closed with its own weight and the weight of the crown bar.

The same portions as those of the prior art are omitted here.

Second Embodiment

Figure 4:
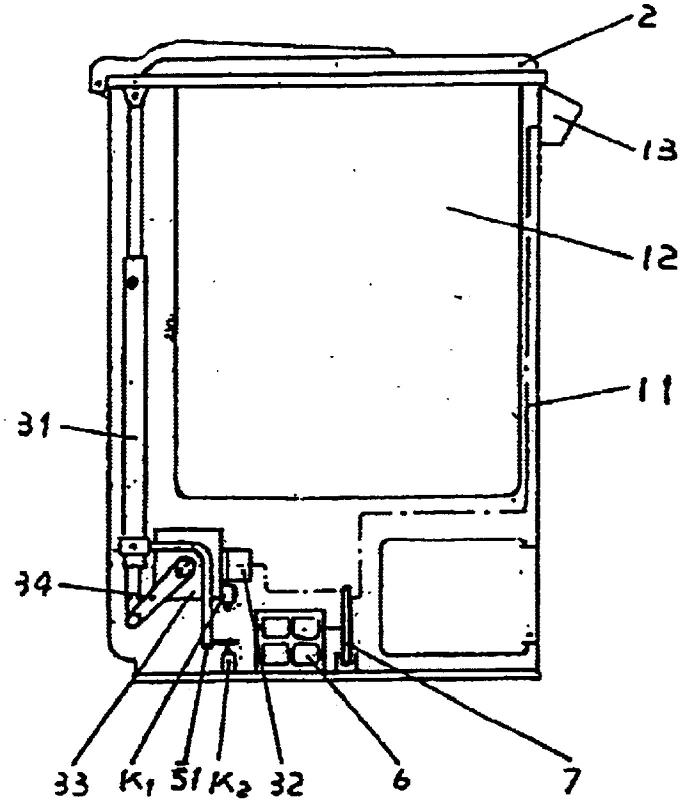
FIG. 4 is a schematic diagram showing configurations of an induction-actuated container according to second embodiment of the invention.

Referring to FIG. 4, the induction-actuated container consists of a container body, a container cover 2, a drive means, and induction means, and a limit device. The drive means includes a driven operating member 31, a gear change mechanism 33 and a drive member 32. The driven operating member 31 is a crown bar, which is connected to a crank 34 at the lower end. The other end of the crank is connected to the output shaft of the gear change mechanism 33. The gear change mechanism 33 is transmissively connected to the output shaft of the motor, which forms the drive member 32. The limit device includes an upper travel switch K1, a lower travel switch K2 and a trigger bar 51. The upper and lower switches are mounted opposite to each other and fixed at the bottom of outer body 11 of the container. One end of the trigger bar is connected to the crown bar; the other end is plugged between of the upper travel switch K1 and the lower travel switch K2.

Figure 5:
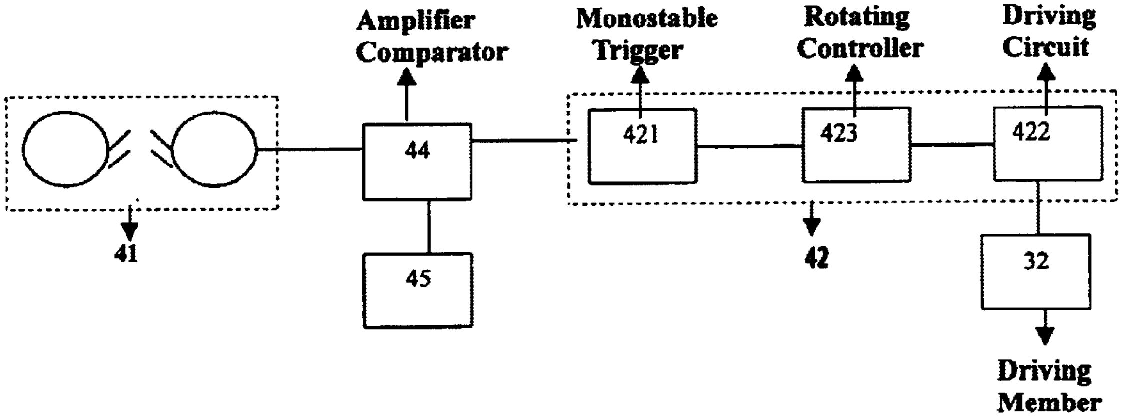
FIG. 5 is a block diagram showing the operating principle of the induction means used in the induction-actuated container according to the second embodiment of the invention.

Referring to FIG. 5, the induction means consists of a sensor 41, an amplifying comparator 44 and an actuating controller 42 for the driving member. The actuating controller 42 for the driving member includes a monostable trigger 421, a driving circuit 422, and a rotating controller 423 of the drive member. The amplifying comparator 44 is connected between the sensor 41 and the monostable trigger 421. The monostable trigger first is electrically connected with the buck-boost rotating controller 423 of the drive member, then connected with the driving circuit 422. The base circuit 45 is connected with amplifying comparator 44.

Figure 6A:
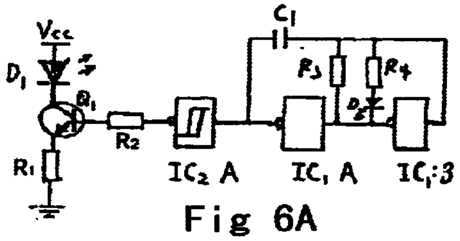
FIGS. 6A and 6B show is a circuit diagram of the induction means used in the induction-actuated container according to the second embodiment of the invention.
Figure 6B:
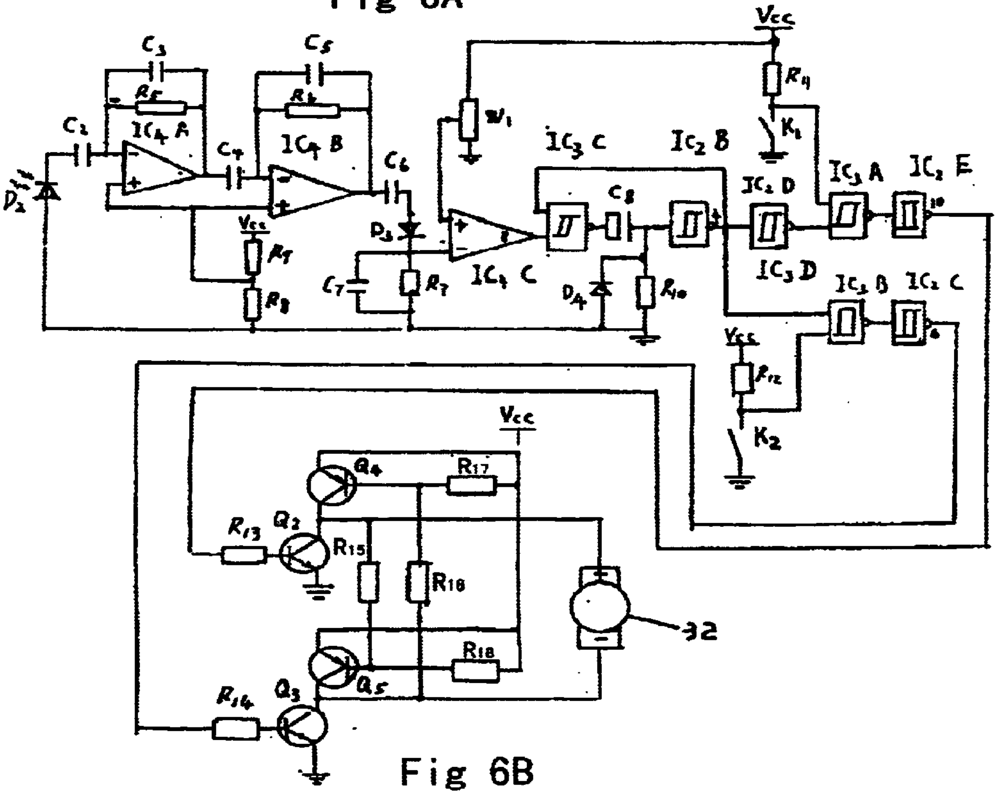

Referring to FIGS. 6A and 6B, the sensor 41 consists of an infrared transmitter and an infrared receiver. Two units (IC1A and IC1B) of a hexad-inverter CD4069, resistors R3 and R4, diode D5 and capacitor C1 forms the narrow pulse oscillating circuit. The shaping and amplifying circuit is formed by the of the unit IC2A of the hexad-inverter 74HC14 and the transistor Q1, and connected with the infrared LED D1. The infrared receiver is mainly consisted of the infrared detection diode D2. There are two amplifiers in the amplifying comparator 44. The comparator is consisted by unit IC4A and unit IC4B of the operational amplifier LM324, peripheral capacitors C2 to C6, and resistors R5 to R8. The infrared detection diode D2 is connected with the negative terminal (−) of unit IC4A via capacitor C2. Capacitor C4 is connected between the output terminal of unit IC4A and the negative terminal of unit IC3B. The output end of unit IC4B is connected to diode D3 via capacitor C6. Diode D3 is connected to capacitor C7, resistor R9, and the negative terminal of unit IC4C from operational amplifier LM324. The comparator of the amplifying comparator 44 is consisted of unit IC4C, diode D3, capacitor C7 and resistor R9. Varistor W1 is connected with the positive terminal (+) of unit IC4C to provide a reference voltage. The monostable trigger 421 is formed by the unit IC3C of NAND gate 74LS24, unit IC2B of hexad-inverter 74HC14, capacitor C8, diode D4 and resistor R10. Capacitor CB is connected cross unit IC3C and unit IC2B, and is separately connected with diode D4 and resistor R10. Unit IC2B is connected with unit IC2D, and IC3C is connected with IC3B. The rotating controller 423 of the drive member is formed by the units IC2C, IC2D and IC2E of hexad-inverter 7p4LS24, travel switches K1 and K2, and resistors R11 and R12. The unit IC3A is connected to resistor R11 and travel switch K1; Unit IC3B is connected to resistor R12 and travel switch K2; Unit IC2E is connected to the base electrode of transistor Q2 via resistor R13; Unit IC2C is connected to the base of transistor Q3 via resistor R14; Collector of transistor Q2 is separately connected to the collector of transistor Q4 and the positive terminal (+) of a motor; Collector of transistor Q3 is separately connected to the collector of transistor Q5 and the negative terminal (−) of the motor. The driving circuit 422 is formed by the transistors Q2 to Q5 and resistors R13 to R18.

In this embodiment, only two units, IC1A and IC1B, of the hexad-inverter are used. Only five units, IC2A to IC2E, of hexad-inverter 74HC14 of the Schmidt trigger type are used. Only two units, IC3A and IC3B, quad-NAND gate 74LS24 of the Schmidt trigger type, in which each NAND gate has two input terminals, are used. Only three units, IC4A to IC4C, of the operational amplifier LM324 are used.

Operation principle of this embodiment is explained as follows:

Narrow pulse oscillating signal is transmitted by the infrared LED D1 after shaping and amplifying. When there is an approach of human body or an object to the upper part of the induction window 13 equipped with an infrared LED and an infrared detection diode, the infrared signal reflected is inverted into electrical pulse signal after the receiving of the infrared detection diode D2. The signal is sent to the comparator after amplification to compare with the reference voltage. When the amplitude of the amplified signal is higher than the reference voltage, output end of unit IC4C (pin 8 of LM324) is switched from the high level to the low level. The low level then triggers the monostable trigger 421 to make the output end of unit IC2B (pin 4 of 74HC14) send out the low level for a certain interval (about 4 to 6 seconds). The interval depends on the parameters of capacitor C8 and resistor R10.

If the container cover is closed, the upper travel switch is turned off, and the lower travel switch is turned on. The low level makes the output end of unit IC2E (pin 10 of 74HC14) produce a high level and the output end of unit IC2C (pin 6 of 74HC14) produce low level via the operation of the rotating controller 423 of the drive member. These two signals are applied to transistors Q2 and Q5 so that they are turned on, and transistors Q3 and Q4 are turned off. Reverse rotating voltage is applied to the motor terminal to make the motor to rotate reversely to lift the crown bar upward to open the container cover 2.

When the container cover is opened to a limit position, the upper travel switch K1 is turned on and the lower travel switch is turned off. The output ends of unit IC2E (pin 10 of 74HC14) and unit IC2C (pin 6 of 74HC14) are low level. The driving circuit 422 is not functioning and the motor is not energized to keep the container cover 2 at the highest position. When the delay signal interval of the monostable trigger 421 ends, output end of unit IC2B (pin 4 of 74HC14) is switched to high level to make the output ends of unit IC2E (pin 10 of 74HC14) and unit IC2C (pin 6 of 74HC14) become low level and high level respectively. The driving circuit 422, transistors Q3 and Q4 are turned on, transistors Q2 and Q5 are turned off. Forward voltage is applied to the motor to move the crown bar downward to close the container cover 2 gradually. When the cover is closed to its position, the lower travel switch is turned on to make the output end of unit IC2C (ping 6 of 74HC14) is switched to low level. Transistors Q2 to Q5 are turned off and the motor is not energized. The whole circuit is ready for the next operation cycle. The same portions as those of the first embodiment are omitted in this embodiment for simplifying the description.

What is claimed is:

1. An induction actuated container having a container body, a container cover for covering the top opening of the container body and being hinged with one side of the container body, an induction means for detecting that human body or an object approaches the induction actuated container and a driving means for driving the container cover to open and close, wherein the induction means comprising:

a sensor for detecting when a human body or an object approaches the induction actuated container and generating a detecting signal, the sensor located in an induction window on the front side of the container body;

a filter shaping circuit for filtering and shaping the detecting signal; and an actuating controller for receiving the detecting signal filtered and shaped from the filter shaping circuit and generating a trigging signal to the controlling end of a driving member, and the actuating controller having a delay circuit for delaying the period of the trigging signal to a predetermined time so as to control the container cover maintain an opening state during the predetermined time;

wherein the driving means comprising:

the driving member being installed at the bottom of the container body for generating a mechanical action based on the trigging signal delayed and output from the delaying circuit, and being connected with a driven operating member via a transmission part for driving the driven operating member; and the driven operating member having a crown bar, the top end of the crown bar is hinged with the container cover, the hinging point between the top end of the crown bar and the container cover is apart from that between the container cover and the container body, and the bottom end of the crown bar is connected with the transmission part.

2. The induction actuated container according to claim 1, wherein the drive member could be either a motor or an electromagnetic clutch, which provides with up and down movements.

3. The induction actuated container according to claim 1, wherein the container body comprising an outer body having a up opening and an inner barrel, which is sitten in the outer body.

4. The induction actuated container according to claim 1, wherein the delaying circuit is a monostable trigger.

5. The induction actuated container according to claim 1 or 4, wherein the sensor is an inductive oscillator.

6. The induction actuated container according to claim 1 or 4, wherein the sensor is a microwave probe.

7. The induction actuated container according to claim 1 or 4, wherein the sensor comprising an infrared transmitter and an infrared receiver.

8. The induction actuated container according to claim 1 or 4, wherein further comprising: a limit means located at the bottom of the container body; the limit means having an upper and a lower travel switches (K1 and K2) and triggering bar; upper and lower travel switches (K1 and K2) are arranged opposite to each other and mounted to the container body; one end of the triggering bar is connected to the driven operating member; another end is connected between the upper travel switch and the lower travel switch (K1 and K2).

* * * * *